(12) United States Patent
Minegishi

(10) Patent No.: US 12,200,177 B2
(45) Date of Patent: Jan. 14, 2025

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Haruna Minegishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/486,117

(22) Filed: Oct. 12, 2023

(65) Prior Publication Data

US 2024/0129419 A1   Apr. 18, 2024

(30) Foreign Application Priority Data

Oct. 18, 2022   (JP) ................. 2022-166698

(51) Int. Cl.
*H04N 1/00* (2006.01)
*H04N 1/32* (2006.01)

(52) U.S. Cl.
CPC ..... *H04N 1/32651* (2013.01); *H04N 1/00408* (2013.01)

(58) Field of Classification Search
None
See application file for complete search history.

(56) References Cited

U.S. PATENT DOCUMENTS

| | | | | |
|---|---|---|---|---|
| 11,321,075 | B1* | 5/2022 | Gore | G06F 11/1417 |
| 2002/0059310 | A1* | 5/2002 | Choi | G06F 11/0793 |
| 2004/0078708 | A1* | 4/2004 | Li | G06F 11/327 |
| | | | | 714/E11.187 |
| 2005/0005042 | A1* | 1/2005 | Fukunaga | G06F 9/4413 |
| | | | | 710/62 |
| 2012/0274980 | A1* | 11/2012 | Koike | H04N 1/00973 |
| | | | | 358/1.15 |
| 2015/0081050 | A1* | 3/2015 | Miwa | G05B 15/02 |
| | | | | 700/83 |
| 2016/0231971 | A1* | 8/2016 | Sato | H04N 1/00204 |
| 2019/0258432 | A1* | 8/2019 | Iwasaki | G06F 3/1204 |
| 2020/0133600 | A1* | 4/2020 | Kanamori | G06F 3/1228 |

FOREIGN PATENT DOCUMENTS

| | | | | |
|---|---|---|---|---|
| JP | 2005115926 | * | 4/2005 | .......... G06F 3/1226 |
| JP | 2015-060383 | | 3/2015 | |

* cited by examiner

*Primary Examiner* — Beniyam Menberu
(74) *Attorney, Agent, or Firm* — Venable LLP

(57) ABSTRACT

Provided are an information processing apparatus, a control method, and a storage medium that inform of an error that occurs in one processing without stopping the other processing during setup by parallel processing. To this end, in the setup performed by the parallel processing, the error that occurs in the one processing is informed after it is confirmed that the other processing is not affected.

13 Claims, 13 Drawing Sheets

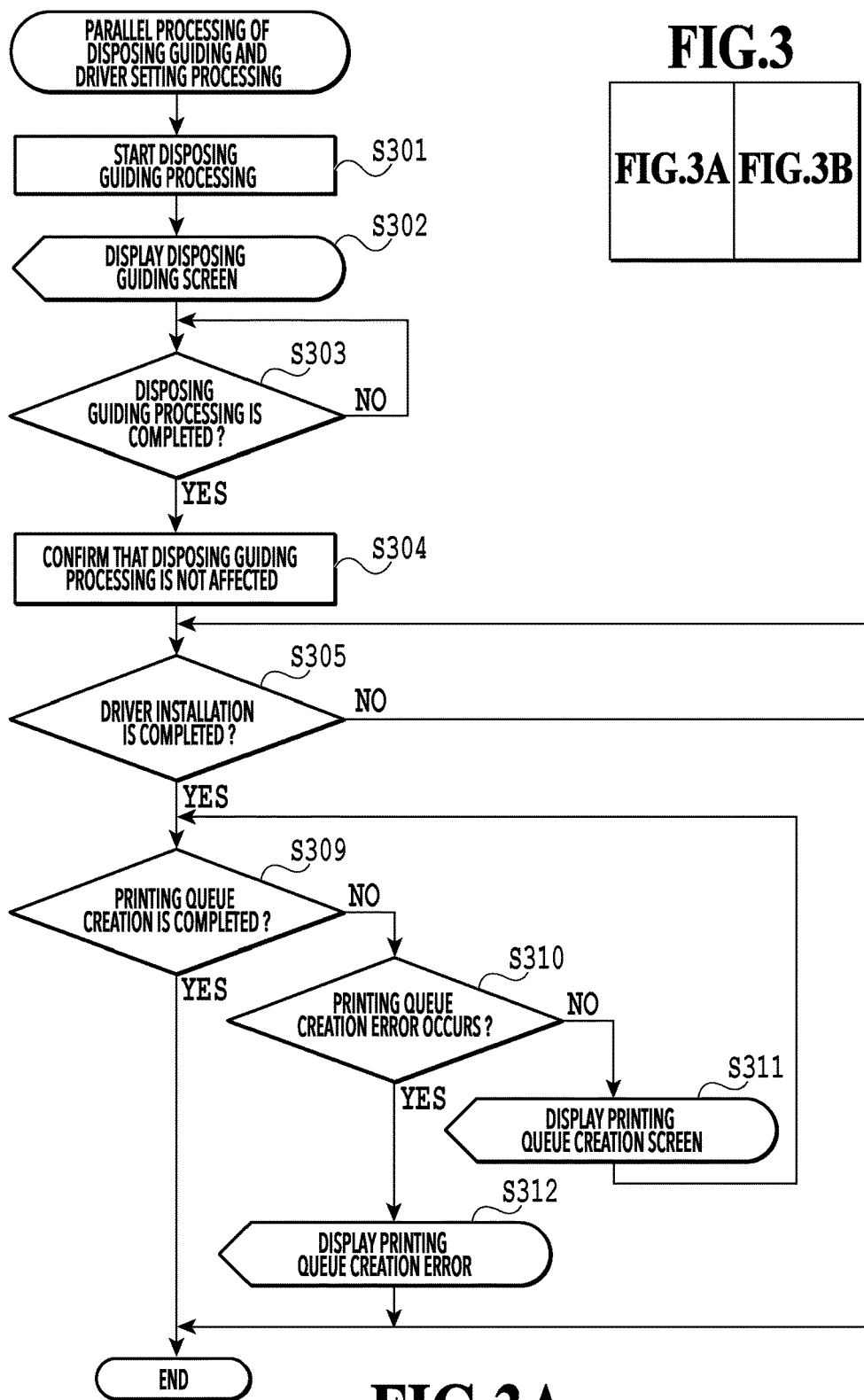

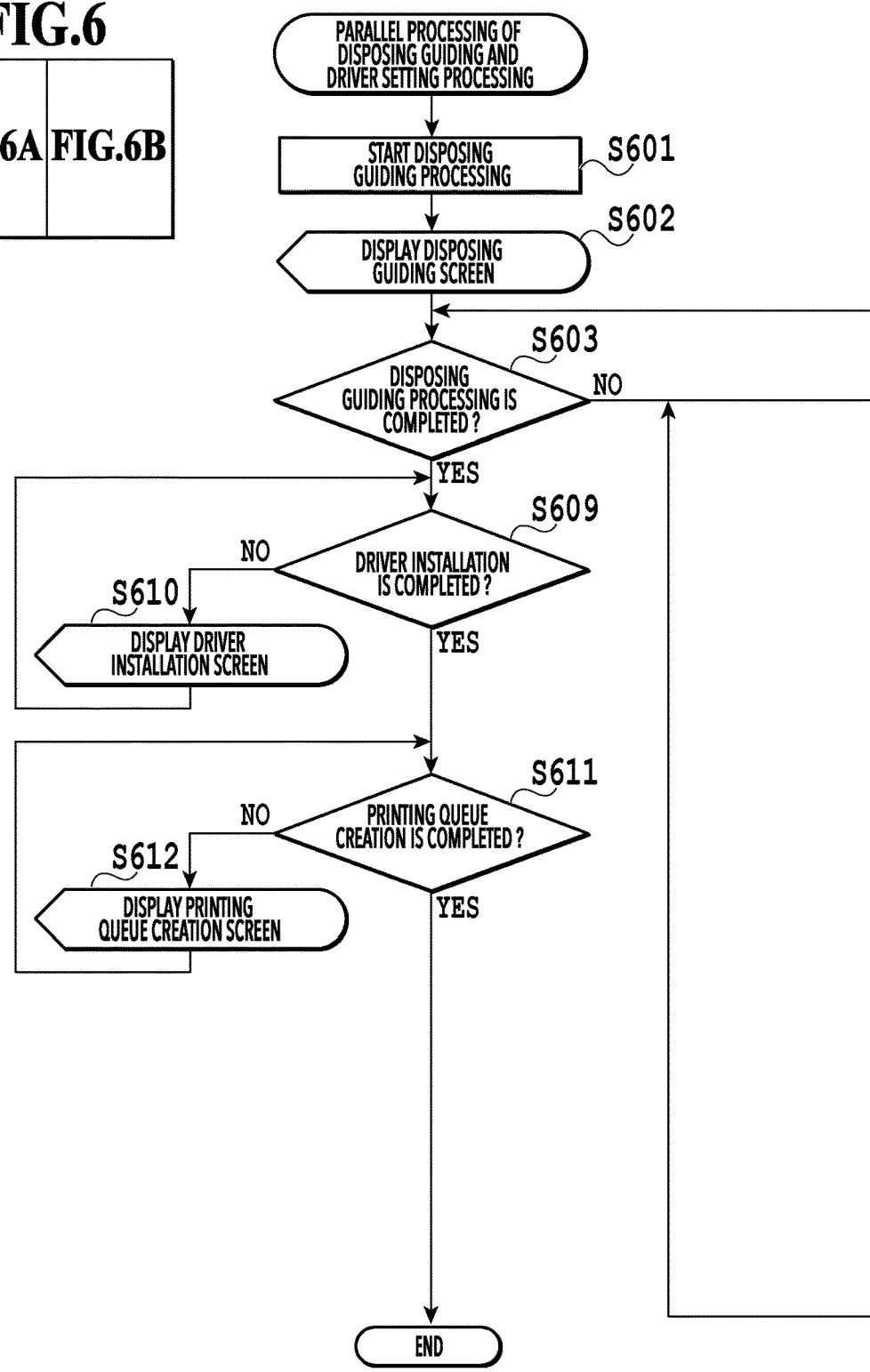

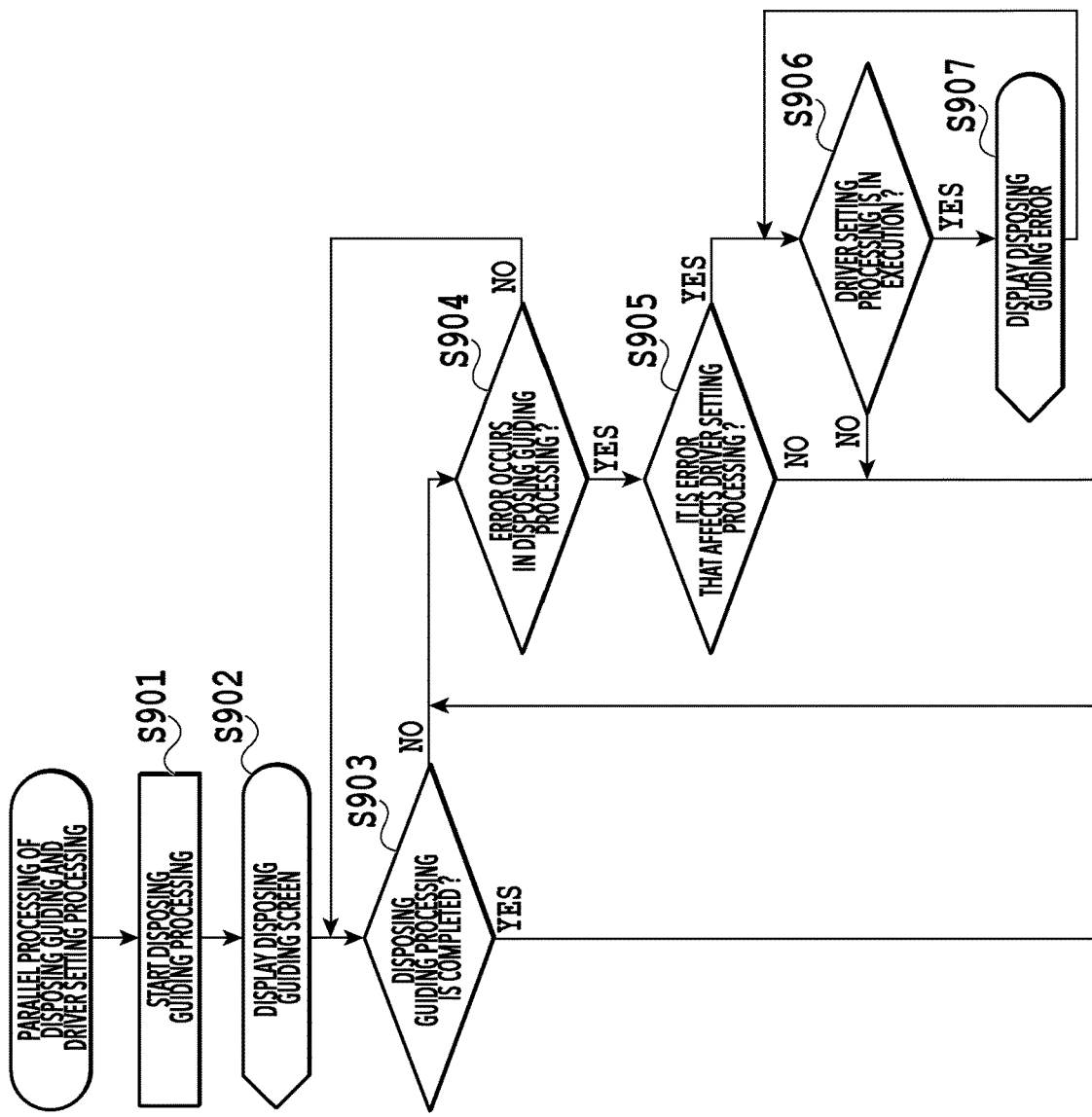

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium that perform parallel processing in setup of an apparatus.

Description of the Related Art

Before starting the use of a printing apparatus, a user connects the printing apparatus with an information processing apparatus and performs setup, which is processing to enable the information processing apparatus to control the printing apparatus. Japanese Patent Laid-Open No. 2015-060383 discloses a method of causing a computer to execute displaying processing to display a screen sequentially guiding a setup procedure and setting processing including software installation in parallel so as to shorten the time required for the setup.

In a case where the displaying processing to sequentially guide the setup procedure in accordance with a work of the user (hereinafter, also referred to as disposing guiding processing) and the setting processing including the software installation (hereinafter, also referred to as driver setting processing) are performed as parallel processing, there is a concern as described below.

In a case where an error occurs in the work of the user during the disposing guiding processing, if an error resolving operation is informed immediately, and the user performs the error resolving operation, another error is caused in the driver setting processing by the error resolving operation, and the setup may not be completed. For example, in a case where a guide to perform a resolving operation to power off the apparatus is displayed, there is a possibility that the software is not installed properly.

Additionally, in a case where an error occurs in the driver setting processing, if the error is informed in the middle of the disposing guiding processing, a guide that is not related to the setup procedure currently displayed is displayed, and thus there is a possibility that this may confuse the user.

SUMMARY OF THE INVENTION

Therefore, the present invention provides an information processing apparatus, a control method, and a storage medium that inform of an error that occurs in one processing without stopping the other processing during setup by parallel processing.

To this end, the information processing apparatus of the present invention is an information processing apparatus that is connected with an apparatus and that performs in parallel at least a part of first processing and second processing included in setup processing that is processing to make the apparatus available, including: a determination unit that determines whether a predetermined condition is satisfied based on states of the first processing and the second processing; and an informing unit that informs, in a case where an error occurs in one of the first processing and the second processing, of the error that occurs in the one processing on condition that the determination unit determines that the predetermined condition is satisfied.

According to the present invention, it is possible to provide an information processing apparatus, a control method, and a program that inform of an error that occurs in one processing without stopping the other processing during setup by parallel processing.

Further features of the present invention will become apparent from the following description of exemplary embodiments with reference to the attached drawings.

DESCRIPTION OF THE EMBODIMENTS

First Embodiment

A first embodiment of the present invention is described below with reference to the drawings.

Figure 1:
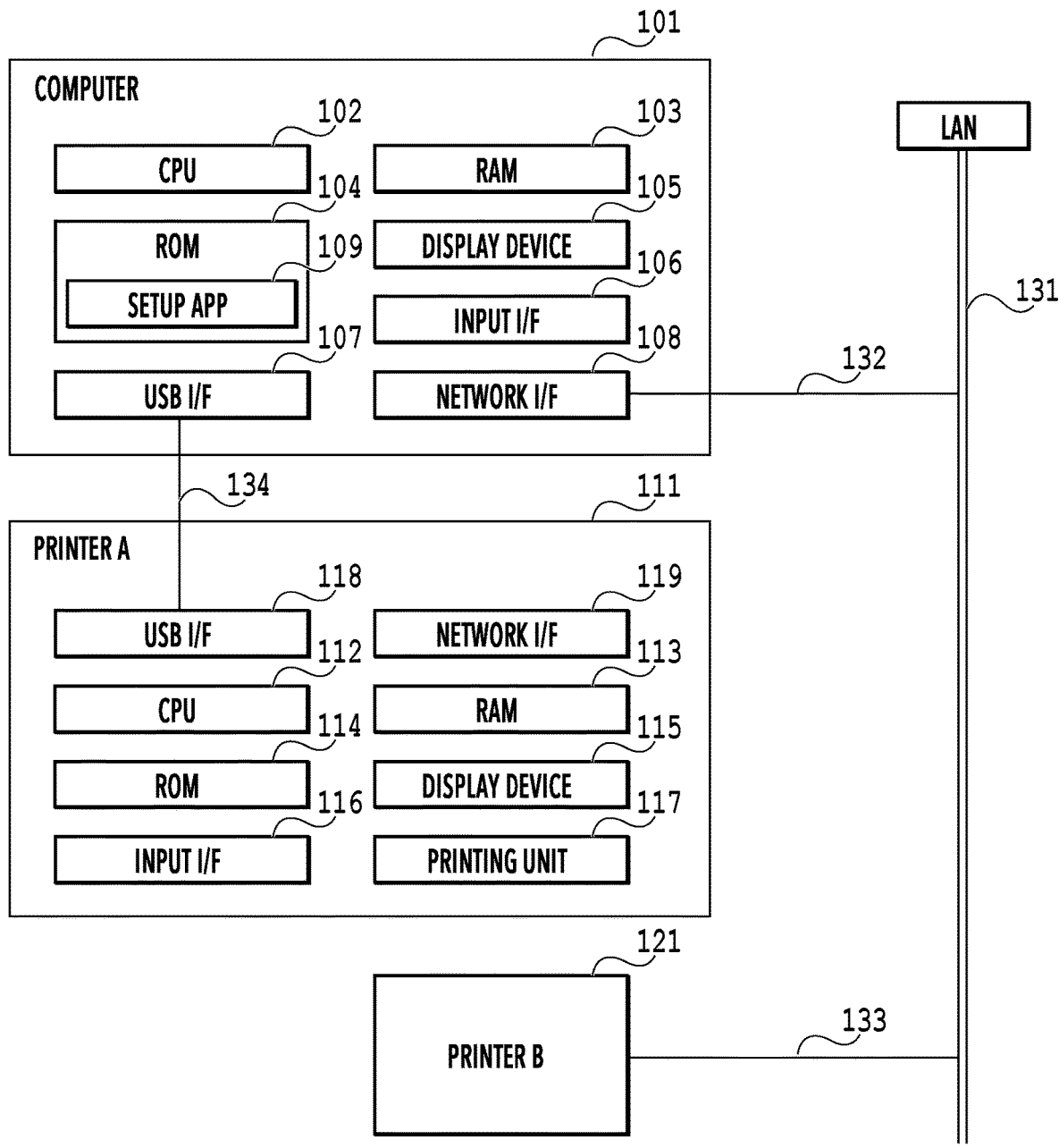
FIG. 1 is an overall configuration diagram of a printing system.

FIG. 1 is an overall configuration diagram of a printing system in the present embodiment. A computer 101, which is an information processing apparatus, includes a CPU 102, a RAM 103, a ROM 104, a display device 105, an input I/F 106, a USB I/F 107, and a network I/F 108. The ROM 104 stores a setup app 109. The computer 101 is connectable with a printer A111 through a USB cable 134. Additionally, the computer 101 is connectable to a LAN 131 through a LAN 132. Although it is described that the computer 101 includes both the network I/F and USB I/F as a connection I/F, the present embodiment is applicable as long as the computer 101 includes either one of them.

The printer A111 includes a CPU 112, a RAM 113, a ROM 114, a display device 115, an input I/F 116, a printing unit 117, a USB I/F 118, and a network I/F 119. The printer A111 is connectable with the computer 101 through the USB cable 134.

A printer B121 has an equivalent configuration as that of the printer A111. The printer B121 is connectable to the LAN 131 through a network connection 133 and is connectable with the computer 101 connected to the same LAN 131. In the present embodiment, both the wireless LAN and wired LAN are applicable as the LANs 132 and 133. Additionally, although it is described as an example that both the network I/F and USB I/F are included as the I/F connected to the printer (the printers A111 and B121), the present embodiment is applicable as long as either one of them is included.

Figure 2:
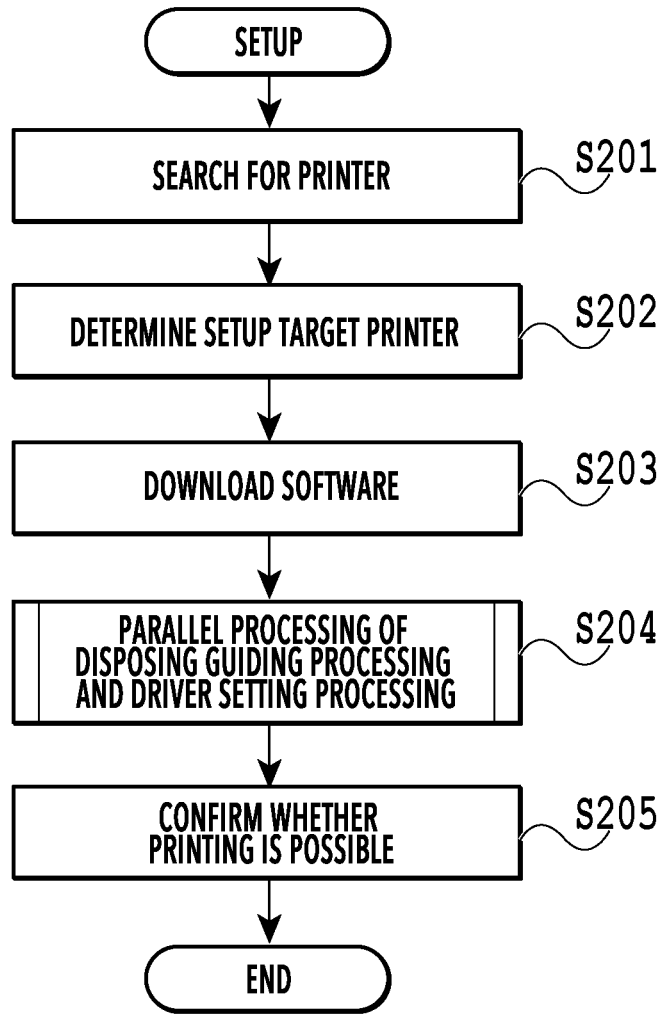
FIG. 2 is a flowchart illustrating setup processing.

FIG. 2 is a flowchart illustrating setup processing by the setup app 109 of the computer 101. The setup is processing to make the printer available by performing processing. A series of the processing illustrated in FIG. 2 is performed with the CPU 102 of the computer 101 deploying a program code stored in the ROM 104 to the RAM 103 to execute. Additionally, a part of or all the functions of the steps in FIG. 2 may be implemented by hardware such as an ASIC or an electronic circuit. Note that, a sign "S" in each description of the processing means a step in the flowchart.

Once the setup is started, in S201, the CPU 102 searches for the printer (the printers A111 and B121). Thereafter, in S202, the CPU 102 determines one printer selected by the user (either of the printers A111 and B121) out of the printers found by the searching (the printers A111 and B121) as a setup target printer. Next, in S203, the CPU 102 downloads software such as a driver of the setup target printer (either of the printers A111 and B121).

Subsequently, in S204, the CPU 102 communicates with the printer (either of the printers A111 and B121) and performs driver setting processing in parallel with disposing guiding processing to guide a disposing operation including methods of ink mounting and sheet setting in an interactive manner (hereinafter, referred to as parallel processing). Specifically, the driver setting processing is executed in the disposing guiding processing. The driver setting processing includes installation of the driver downloaded in S203 and printing queue creation processing. Thereafter, in S205, the CPU 102 confirms whether printing such as test printing is possible and ends the setup.

In the present embodiment, processing to inform of an error and an error resolving operation without stopping the disposing guiding processing even in a case where the error occurs in the driver setting processing is described with reference to FIGS. 3, 4, 5 and FIGS. 10A to 10G.

Figure 3B:
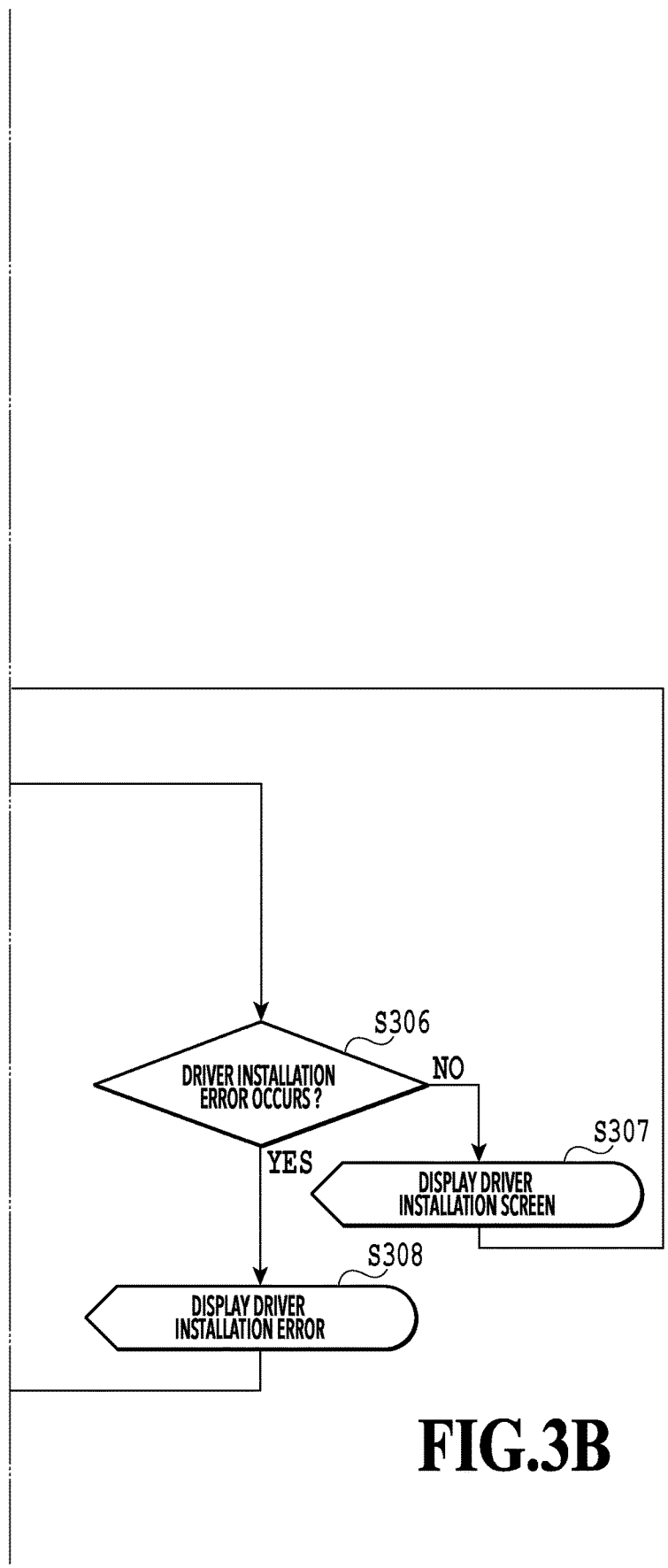
FIG. 3 is diagram showing the relationship of FIG. 3A and FIG. 3B, and FIG. 3A and FIG. 3B are flowcharts illustrating parallel processing.

FIG. 3A and FIG. 3B are a flowchart illustrating the parallel processing by the computer 101. That is, FIG. 3A and FIG. 3B are a flowchart illustrating detailed processing of S204 in FIG. 2. Additionally, FIGS. 10A to 10G are diagrams each illustrating a screen displayed on the display device 105 of the computer 101.

Once the parallel processing is started, in S301, the CPU 102 starts the disposing guiding processing. Details of the disposing guiding processing are described with reference to FIG. 4 described later. In the present embodiment, the parallel processing of the disposing guiding processing and the driver setting processing is performed by starting the driver setting processing during the disposing guiding processing. Thereafter, in S302, in response to a notification from a disposing guiding thread, the CPU 102 displays a disposing guiding screen 1001 illustrated in FIG. 10A on the display device 105 of the computer 101. Thereafter, in S303, the CPU 102 determines whether the disposing guiding processing is completed. The determination is to determine whether there is a completion notification from the disposing guiding processing. If there is no completion notification, and it is determined that the disposing guiding processing is not completed, the determination on whether the disposing guiding processing is completed is repeated and executed again. If it is determined that the disposing guiding processing is completed, the CPU 102 allows the process to proceed to S304 and confirms (determines) that the subsequent processing does not affect the disposing guiding processing. In a case where the disposing guiding processing is completed, and there is the completion notification, the subsequent processing does not affect the disposing guiding processing; therefore, the process proceeds to S305, which is the next processing.

During the processing from S301 to S303, the driver setting processing is also processed in parallel. In the present embodiment, in either case where the driver setting processing processed in parallel continues or ends, the process does not proceed to S305 and subsequent processing until it is determined in S303 that the disposing guiding processing is completed, and it is confirmed in S304 that the disposing guiding processing is not affected. The obtainment of the completion notification of the disposing guiding processing makes it possible to confirm that there is no possibility that the subsequent processing affects the disposing guiding processing. Accordingly, in a case where the CPU 102 confirms that there is the completion notification of the disposing guiding processing, the processing in and after S305 is performed.

In S305, the CPU 102 determines whether the driver installation is completed. The determination in S305 is performed with reference to a database of a driver installation completion state saved by the driver setting processing described in detail with reference to FIG. 5 described later. If it is determined that the driver installation is not completed, the CPU 102 allows the process to proceed to S306 and determines whether an error occurs in the driver installation. That is, the CPU 102 functions as an error occurrence determination unit in S306. The determination in S306 is performed with reference to a database of a driver installation error occurrence state saved by the driver setting processing (see FIG. 5).

Figure 10A:
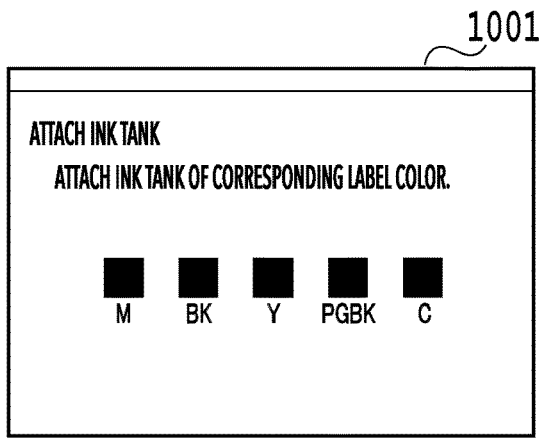
FIG. 10A is a diagram illustrating a screen displayed on a display device of a computer.
Figure 10B:
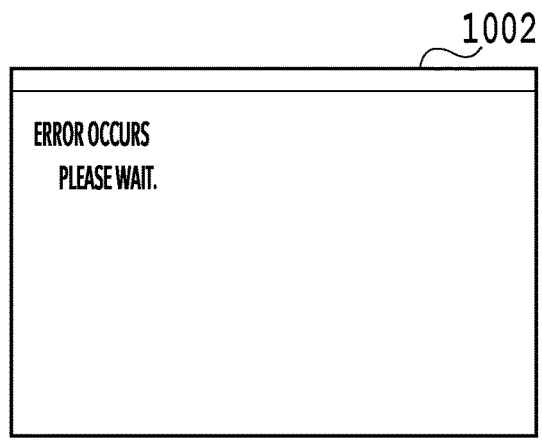
FIG. 10B is a diagram illustrating a screen displayed on the display device of the computer.
Figure 10C:
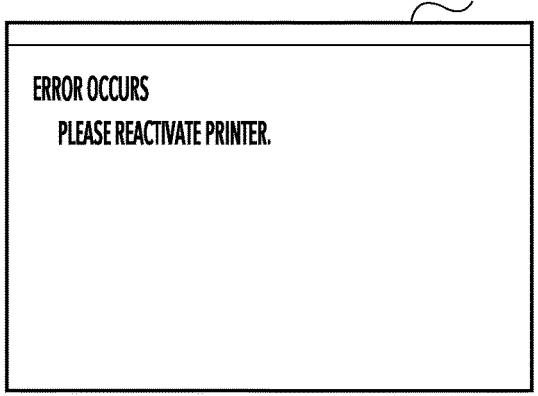
FIG. 10C is a diagram illustrating a screen displayed on the display device of the computer.
Figure 10D:
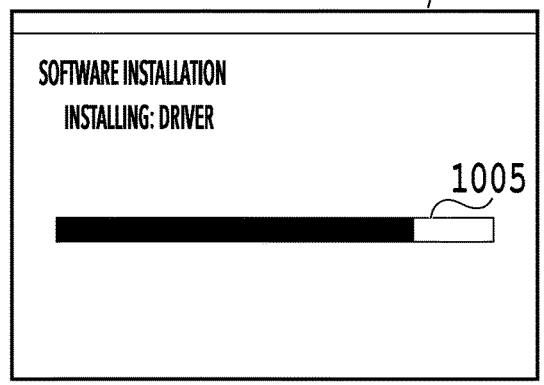
FIG. 10D is a diagram illustrating a screen displayed on the display device of the computer.
Figure 10E:
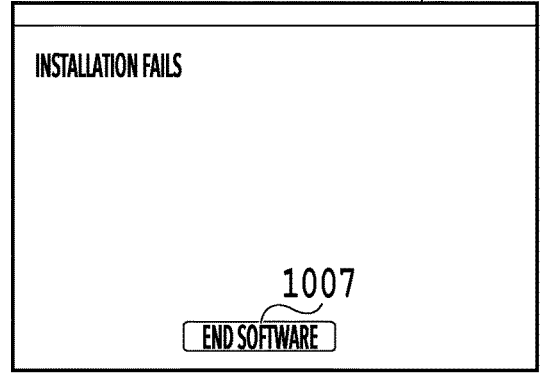
FIG. 10E is a diagram illustrating a screen displayed on the display device of the computer.

If it is determined in the determination in S306 that no error occurs, the CPU 102 allows the process to proceed to S307 and displays a driver installation screen 1004 illustrated in FIG. 10D on the display device 105 of the computer 101. In other words, the screen 1001 that displays the disposing guide in S302 until this process is switched to the driver installation screen 1004. Note that, the screen 1001 may be switched directly to the screen 1004, or another guide screen may be displayed in between. A progress bar 1005 on the screen 1004 indicates progress of the driver installation. In the present embodiment, as described above, the disposing guiding processing and the driver setting processing are processed in parallel. Thus, the screen displayed in S307 often indicates that the processing has been progressed to some extent. After the displaying in S307, the CPU 102 allows the process to return to S305 and determines again whether the driver installation is completed. If it is determined in S306 that an error occurs, the CPU 102 allows the process to proceed to S308 and displays a driver installation error screen 1006 illustrated in FIG. 10E on the display device 105 of the computer 101. Once a software end button 1007 on the screen 1006 is pressed, the parallel processing ends.

If it is determined in the determination in S305 that the driver installation is completed, the CPU 102 allows the process to proceed to S309 and determines whether printing queue creation is completed. The determination in S309 is performed with reference to a database of a printing queue creation completion state saved by the driver setting processing.

If it is determined in the determination in S309 that the printing queue creation is not completed, the CPU 102 allows the process to proceed to S310 and determines whether a printing queue creation error occurs. The determination in S310 is performed with reference to a database of a printing queue creation error occurrence state saved by the driver setting processing. If it is determined in the determination in S310 that no error occurs, the CPU 102 allows the process to proceed to S311 and displays a printing queue creation screen 1008 illustrated in FIG. 10F on the display device 105 of the computer 101. A progress bar 1009 on the screen 1008 indicates progress of the printing queue creation processing. Thereafter, the CPU 102 allows the process to return to S309 and determines again whether the printing queue creation is completed.

Figure 10F:
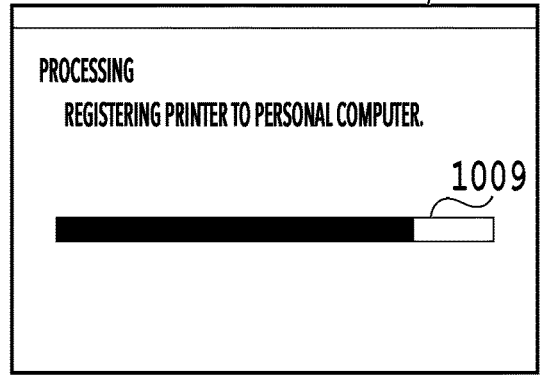
FIG. 10F is a diagram illustrating a screen displayed on the display device of the computer.
Figure 10G:
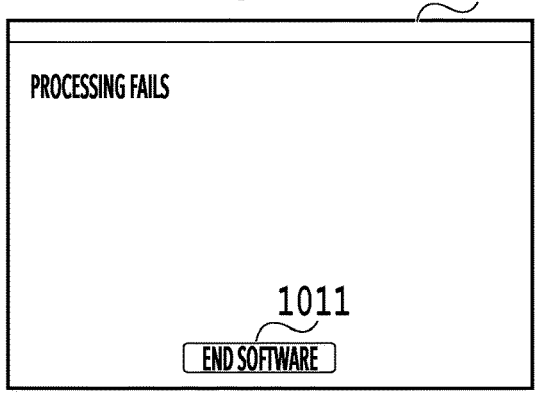
FIG. 10G is a diagram illustrating a screen displayed on the display device of the computer.

If it is determined in the determination in S310 that an error occurs, the CPU 102 allows the process to proceed to S312 and displays a printing queue creation error screen 1010 illustrated in FIG. 10G on the display device 105 of the computer 101. Once a software end button 1011 on the screen 1010 is pressed, the parallel processing ends.

If it is determined in the determination in S309 that the printing queue creation is completed, the parallel processing ends.

Figure 4:
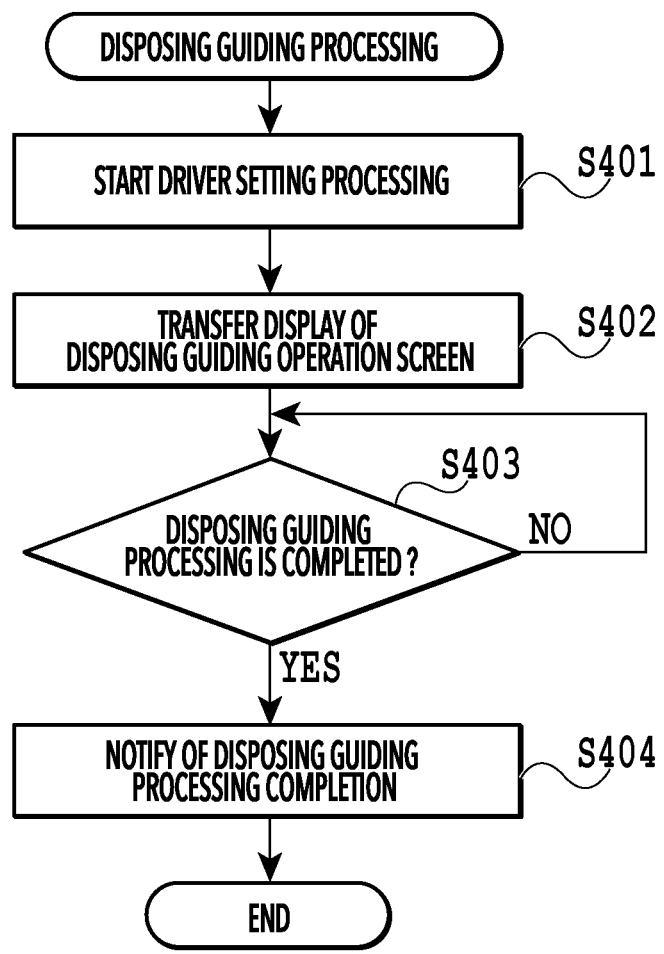
FIG. 4 is a flowchart illustrating disposing guiding processing.

FIG. 4 is a flowchart illustrating the disposing guiding processing that starts the processing in S301 in the parallel processing in FIG. 3A and FIG. 3B.

Once the disposing guiding processing is started, in S401, the CPU 102 starts the driver setting processing. Thus, the parallel processing of the disposing guiding processing and the driver setting processing is started. The driver setting processing is described in detail with reference to FIG. 5 described later. Next, in S402, the CPU 102 transfers an instruction to display a disposing guiding operation screen to a thread of the parallel processing. Next, in S403, the CPU 102 determines whether the disposing guiding processing is completed by communicating with the printer (either of the printers A111 and B121). If it is determined in the determination in S403 that the disposing guiding processing is not completed, the CPU 102 repeats again the determination on whether the disposing guiding processing is completed. If it is determined in the determination in S403 that the disposing guiding processing is completed, the CPU 102 allows the process to proceed to S404, notifies the parallel processing of that the disposing guiding processing is completed, and ends the disposing guiding processing.

Figure 5:
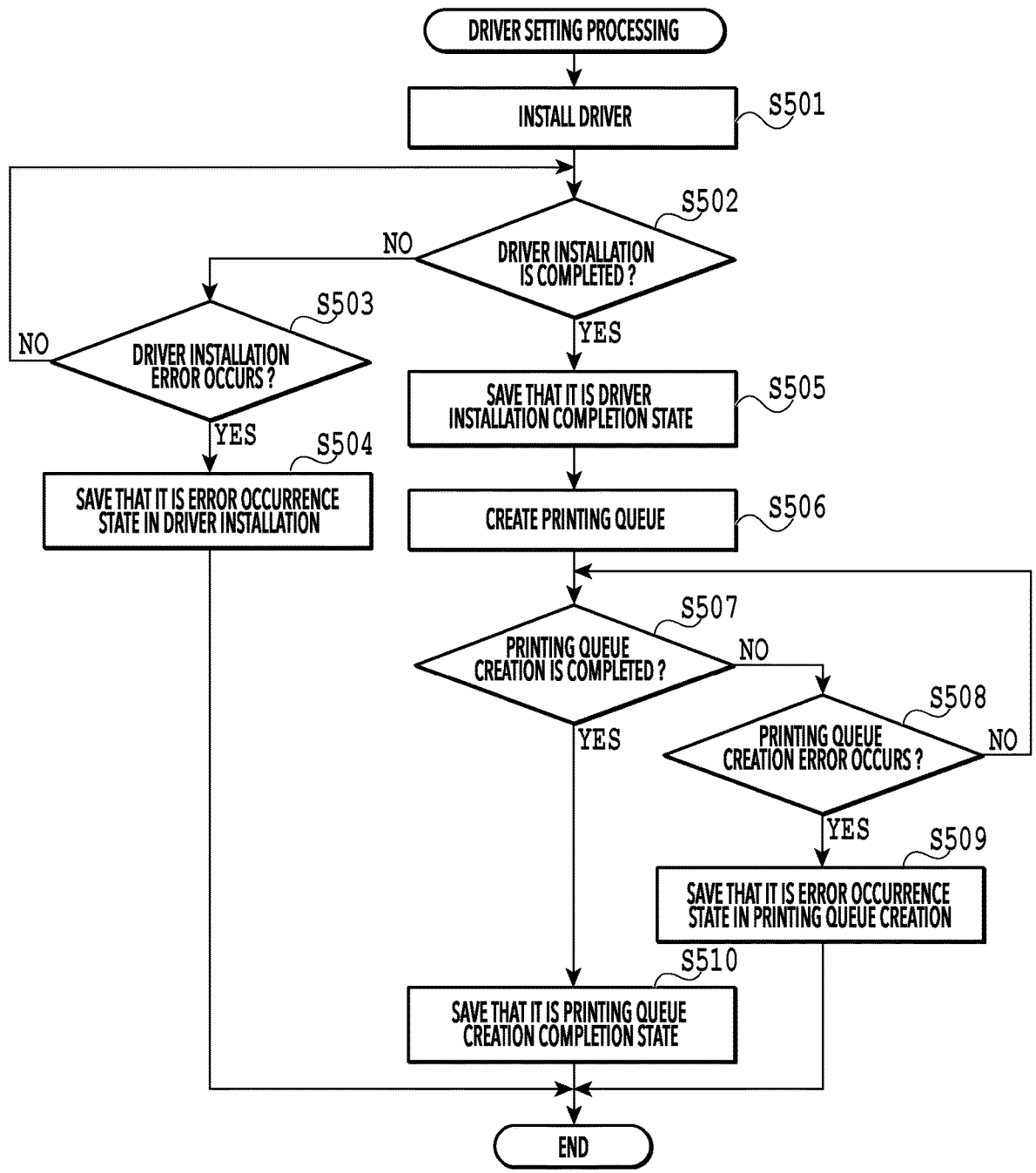
FIG. 5 is a flowchart illustrating driver setting processing.

FIG. 5 is a flowchart illustrating the driver setting processing performed in S401 in the disposing guiding processing in FIG. 4. A series of the processing illustrated in FIG. 5 is performed with the CPU 102 of the computer 101 deploying the program code stored in the ROM 104 to the RAM 103 to execute. Additionally, a part of or all the functions of the steps in FIG. 5 may be implemented by hardware such as an ASIC or an electronic circuit. Note that, the sign "S" in each description of the processing means a step in the flowchart.

Once the driver setting processing is started, in S501, the CPU 102 starts the driver installation. The driver installation is executed by activating a not-illustrated external installer. Thereafter, in S502, the CPU 102 determines whether the driver installation is completed. The determination in S502 is performed by confirming an execution state of the not-illustrated external installer. In S502, if it is determined that the driver installation is not completed, the CPU 102 allows the process to proceed to S503 and determines whether an error occurs in the driver installation. The determination in S503 is performed by confirming the execution state of the external installer. If it is determined in the determination in S503 that an error occurs, the CPU 102 allows the process to proceed to S504, saves that an error occurs into a database to which reference from other processing (the disposing guiding processing and the parallel processing) can be made, and ends the driver setting processing. Note that, a driver setting thread is merely a thread to perform the driver setting processing, and no displaying is performed in the present thread. A thread that performs displaying is the parallel processing thread, which is a thread that calls the disposing guiding thread calling the driver setting thread. Therefore, in the processing illustrated in FIG. 5, the processing to save the information indicating that it is an error occurrence state is performed, but no displaying processing is performed.

If it is determined in the determination in S503 that no error occurs in the driver installation, the CPU 102 allows the process to return to S502 and determines again whether the driver installation is completed.

If it is determined in the determination in S502 that the driver installation is completed, in S505, the CPU 102 saves that the driver installation is in a completion state into the database to which reference from the other processing (the disposing guiding processing and the parallel processing) can be made. Next, the CPU 102 allows the process to proceed to S506 and starts the printing queue creation processing. The printing queue creation processing is executed by activating the external installer.

Thereafter, the CPU 102 allows the process to proceed to S507 and determines whether the printing queue creation is completed. The determination in S507 is performed based on whether an API of an operating system (hereinafter, referred to as an OS) includes a printing queue of the corresponding printer (either of the printers A111 and B121). If it is determined in the determination in S507 that the printing queue creation is not completed, the CPU 102 allows the process to proceed to S508 and determines whether an error occurs in the printing queue creation. The determination in S508 is performed by confirming the execution state of the external installer. If it is determined in the determination in S508 that an error occurs, the CPU 102 allows the process to proceed to S509, saves that an error occurs into the database to which reference from the other processing (the disposing guiding processing and the parallel processing) can be made, and ends the driver setting processing.

On the other hand, if it is determined in the determination in S508 that no printing queue creation error occurs, the CPU 102 allows the process to return to S507 and determines again whether the printing queue creation is completed. If it is determined in the determination in S507 that the printing queue creation is completed, the CPU 102 allows the process to proceed to S510, saves that the printing queue creation is in a completion state into the database to which reference from the other processing (the disposing guiding processing and the parallel processing) can be made, and ends the driver setting processing.

Note that, in the present embodiment, it is described that the state of the disposing guiding processing is obtained (S303) before it is determined that an error occurs in the driver setting processing (S306, S310). However, it is also possible to obtain the state of the disposing guiding processing (S303) after it is determined that an error occurs in the driver setting processing (S306, S310) and to display the error in the driver setting processing after it is confirmed that the disposing guiding processing is not affected (S304).

Additionally, although an example of the connection with the printer is described in the present embodiment, it is not limited thereto, and the connection may be made with another apparatus that performs the parallel processing in setup.

Moreover, although an example of the connection with the two printers is described in the present embodiment, it is not limited thereto, and the connection with one or three or more multiple printers may be made.

Thus, in the present embodiment, in the setup performed by the parallel processing, after it is confirmed that one processing is not affected, an error that occurs in the other processing is informed. Therefore, even in a case where an error occurs in the driver setting processing, it is possible to inform of the error in the driver setting processing without stopping the disposing guiding processing.

In this way, it is possible to provide an information processing apparatus, a control method, and a storage medium that can inform of an error that occurs in one processing without stopping the other processing during the setup by the parallel processing.

Second Embodiment

A second embodiment of the present invention is described below with reference to the drawings. Note that, since a basic configuration of the present embodiment is similar to that of the first embodiment, a characteristic configuration is described below. In the present embodiment, processing to inform of an error and an error resolving operation without stopping the driver setting processing even in a case where the error occurs in the disposing guiding processing is described with reference to FIGS. 6, 7, 8 and FIGS. 10A to 10G.

Figure 6B:
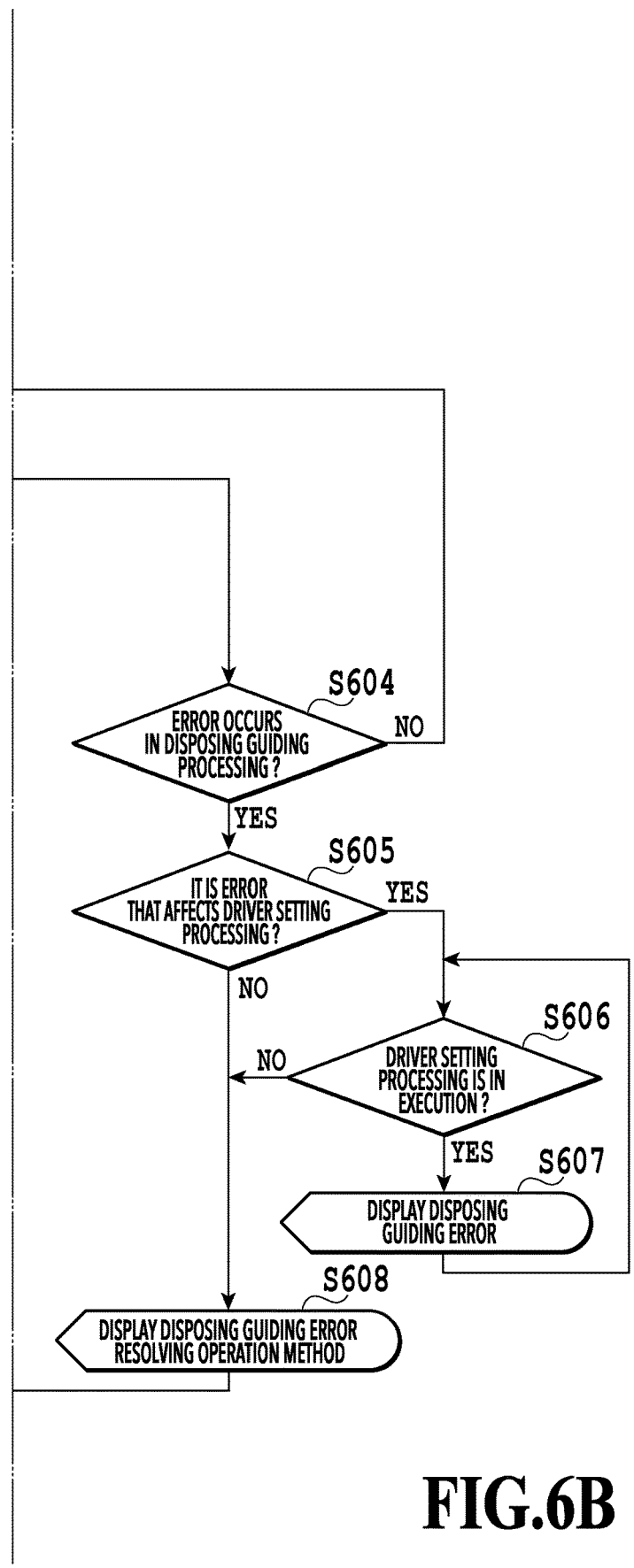
FIG. 6 is a diagram showing the relationship of FIG. 6A and FIG. 6B, and FIG. 6A and FIG. 6B are flowcharts illustrating parallel processing.

FIG. 6A and FIG. 6B are a flowchart illustrating parallel processing in the computer 101 of the present embodiment. A series of the processing illustrated in FIG. 6A and FIG. 6B are performed with the CPU 102 of the computer 101 deploying the program code stored in the ROM 104 to the RAM 103 to execute. Additionally, a part of or all the functions of the steps in FIG. 6A and FIG. 6B may be implemented by hardware such as an ASIC or an electronic circuit. Note that, the sign "S" in each description of the processing means a step in the flowchart.

Once the parallel processing is started, in S601, the CPU 102 starts the disposing guiding processing. The disposing guiding processing is described in detail with reference to FIG. 7 described later. Thereafter, in S602, in response to a notification from the disposing guiding processing, the CPU 102 displays the disposing guiding screen 1001 illustrated in FIG. 10A on the display device 105 of the computer 101. Thereafter, in S603, the CPU 102 determines whether the disposing guiding processing is completed. The determination in S603 is performed based on whether there is the completion notification from the disposing guiding processing. If it is determined in the determination in S603 that the disposing guiding processing is not completed, the CPU 102 allows the process to proceed to S604 and determines whether an error occurs in the disposing guiding processing.

The determination in S604 is performed based on whether there is a disposing guiding error occurrence notification from the disposing guiding processing. If it is determined in the determination in S604 that an error occurs, the CPU 102 allows the process to proceed to S605 and determines whether the occurring error affects the driver setting processing. The error that affects the driver setting processing includes a paper jam that needs a power source operation of the printer to resolve the error. In a case where a paper jam and the like occur, it is determined that there is an error that has an effect. If it is determined in the determination in S605 that there is an error that affects the driver setting processing, the CPU 102 allows the process to proceed to S606 on condition that there is an error that affects the driver setting processing and determines whether the driver setting processing is in the execution. The determination in S606 is performed based on whether there is a printing queue creation completion notification from the driver setting processing.

If it is determined in the determination in S606 that the driver setting processing is in the execution, the CPU 102 allows the process to proceed to S607 and displays a screen 1002 illustrated in FIG. 10B that informs of that an error occurs in the disposing guiding processing on the display device 105 of the computer 101. The screen 1002 displays only that an error occurs and does not inform of an error resolving operation. Thus, it is possible to suppress the execution of an operation that affects the driver setting processing (for example, reactivation) by the user. If it is determined in the determination in S605 that there is an error that does not affect the driver setting processing, and if it is determined in the determination in S606 that the driver setting processing is not in the execution, the CPU 102 allows the process to proceed to S608. In S608, a screen 1003 illustrated in FIG. 10C that informs of an operation to resolve the error that occurs in the disposing guiding processing is displayed on the display device 105 of the computer 101. In other words, in a case where the screen 1002 illustrated in FIG. 10B is displayed, once the driver setting processing in which the processing is performed background is completed thereafter, the screen is switched to the screen 1003 illustrated in FIG. 10C.

Thereafter, the CPU 102 allows the process to return to S604 and determines again whether an error occurs in the disposing guiding processing. If it is determined in the determination in S604 that no error occurs in the disposing guiding processing, the CPU 102 allows the process to return to S603 and determines again whether the disposing guiding processing is completed. If it is determined in the determination in S603 that the disposing guiding processing is completed, the CPU 102 allows the process to proceed to S609 and determines whether the driver installation is completed. The determination in S609 is performed with reference to the database of the driver installation completion state saved by the driver setting processing. If it is determined in the determination in S609 that the driver installation is not completed, the CPU 102 allows the process to proceed to S610 and displays the driver installation screen 1004 illustrated in FIG. 10D on the display device 105 of the computer 101. The progress bar 1005 on the screen 1004 indicates the progress of the driver installation.

Thereafter, the CPU 102 allows the process to return to S609 and determines again whether the driver installation is completed. If it is determined in the determination in S609 that the driver installation is completed, the CPU 102 allows the process to proceed to S611 and determines whether the printing queue creation is completed. The determination in S611 is performed with reference to the database of the printing queue creation completion state saved by the driver setting processing. If it is determined in the determination in S611 that the printing queue creation is not completed, the printing queue creation processing screen 1008 illustrated in FIG. 10F is displayed on the display device 105 of the computer 101. The progress bar 1009 on the screen 1008 indicates the progress of the printing queue creation processing. If it is determined in the determination in S611 that the printing queue creation is completed, the CPU 102 ends the parallel processing.

Figure 7:
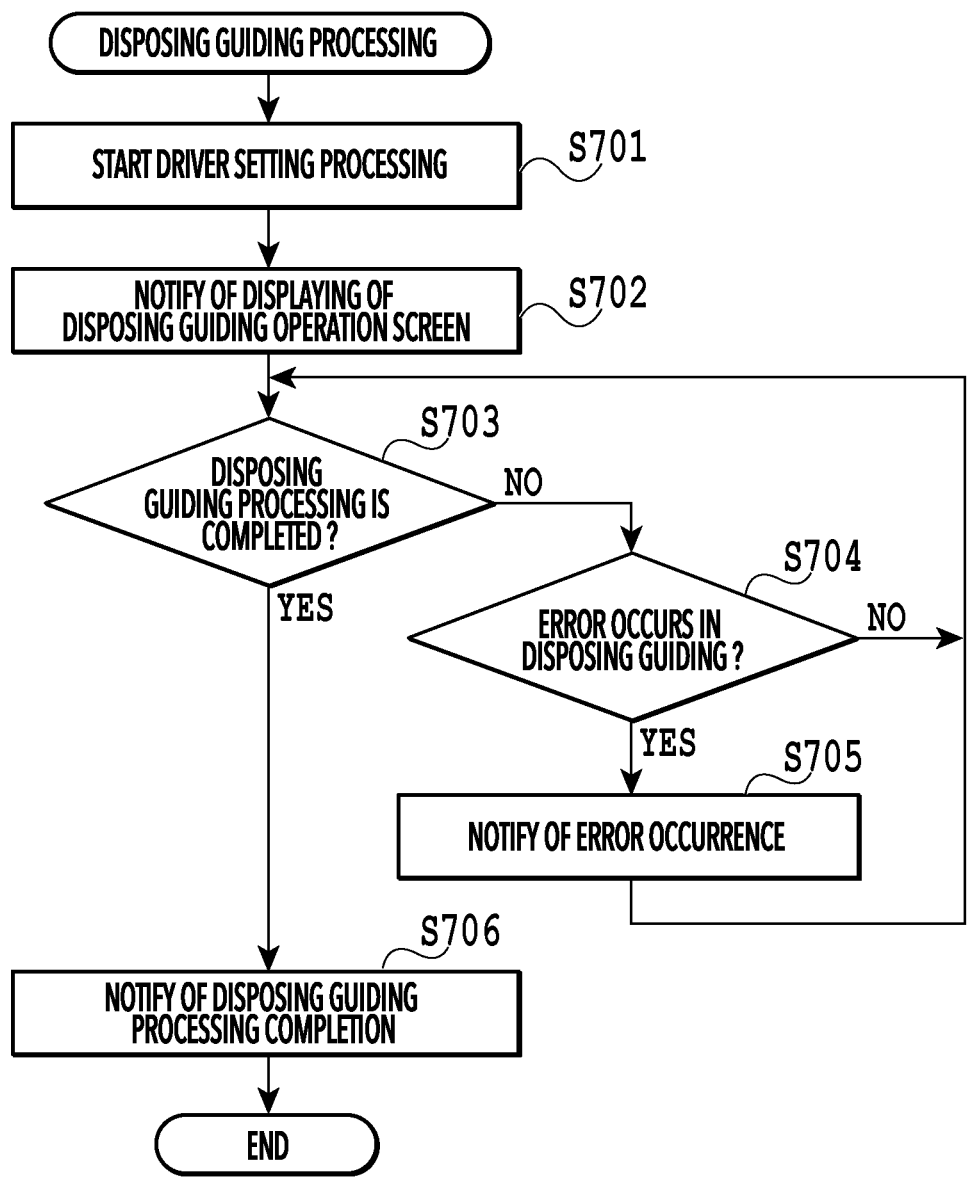
FIG. 7 is a flowchart illustrating disposing guiding processing.

FIG. 7 is a flowchart illustrating the disposing guiding processing performed in S601 in the parallel processing in FIG. 6A and FIG. 6B.

Once the disposing guiding processing is started, in S701, the CPU 102 starts the driver setting processing. The driver setting processing is described in detail with reference to FIG. 8 described later. Thereafter, in S702, the CPU 102 instructs the parallel processing of the disposing guiding processing and the driver setting processing to display the disposing guide. Next, in S703, the CPU 102 communicates with the printer (either of the printers A111 and B121) and determines whether the disposing guiding processing is completed. If it is determined in the determination in S703 that the disposing guiding processing is not completed, the CPU 102 allows the process to proceed to S704 and communicates with the printer (either of the printers A111 and B121) to determine whether an error occurs in the disposing guiding processing. If it is determined in the determination in S704 that no error occurs in the disposing guiding processing, the process returns to S703, and whether the disposing guiding processing is completed is determined again.

On the other hand, if it is determined in the determination in S704 that an error occurs in the disposing guiding processing, the CPU 102 allows the process to proceed to S705 and notifies the parallel processing of the disposing guiding processing and the driver setting processing of that an error occurs in the disposing guiding processing. Then, the process returns to S703, and whether the disposing guiding processing is completed is determined again.

If it is determined in the determination in S703 that the disposing guiding is completed, in S706, the CPU 102 notifies the parallel processing of the disposing guiding processing and the driver setting processing of that the disposing guiding processing is completed and ends the disposing guiding processing.

Figure 8:
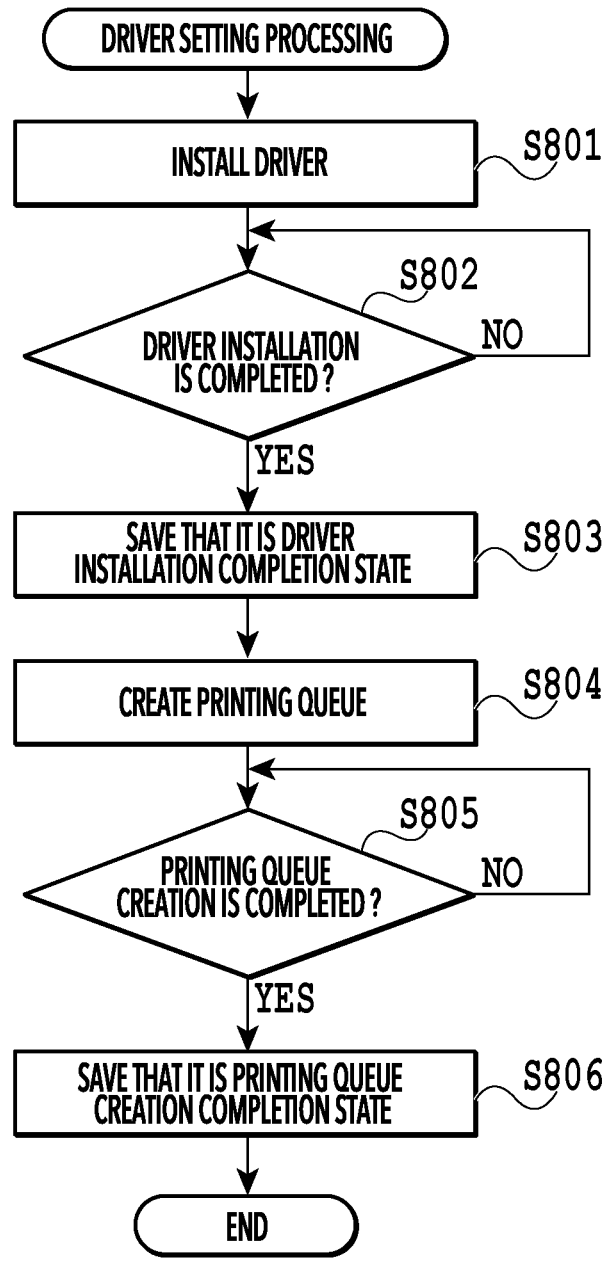
FIG. 8 is a flowchart illustrating driver setting processing.

FIG. 8 is a flowchart illustrating the driver setting processing performed in S701 in the disposing guiding processing in FIG. 7.

Once the driver setting processing is started, in S801, the CPU 102 starts the driver installation. The driver installation is executed by activating the external installer. Thereafter, in S802, the CPU 102 determines whether the driver installation is completed. The determination in S802 is performed by confirming the execution state of the external installer. If it is determined in the determination in S802 that the driver installation is not completed, the determination on whether the driver installation is completed is repeated. If it is determined in S802 that the driver installation is completed, in S803, the CPU 102 saves that the driver installation is in the completion state into the database to which reference from the other processing (the disposing guiding processing and the parallel processing) can be made.

Next, in S804, the CPU 102 starts creating the printing queue. The printing queue is created by activating the external installer. Then, in S805, the CPU 102 determines whether the creation of the printing queue is completed. The determination in S805 is performed based on whether the API of the OS includes the printing queue of the corresponding printer (either of the printer A111 and the printer B121). If it is determined that the creation of the printing queue is not completed in the determination in S805, the determination on whether the creation of the printing queue is completed is repeated. If it is determined in S805 that the creation of the printing queue is completed, the CPU 102 allows the process to proceed to S806, saves that the creation of the printing queue is in the completion state into the database to which reference from another thread can be made, and ends the driver setting processing.

Thus, in the present embodiment, in a case where an error occurs in the disposing guiding processing, whether the error affects the driver setting processing is determined, and if it is determined that the error has no effect, an error resolving method is displayed. Therefore, even in a case where an error occurs in the disposing guiding processing, it is possible to inform of the error in the disposing guiding processing without stopping the driver setting processing.

Third Embodiment

A third embodiment of the present invention is described below with reference to the drawings. Note that, since a basic configuration of the present embodiment is similar to that of the first embodiment, a characteristic configuration is described below. In the present embodiment, with processing that is a combination of a part of the processing in the first embodiment and a part of the processing in the second embodiment, even in a case where an error occurs in one processing of either one of the parallel processing in the setup, an error and an error resolving operation are informed without stopping the other processing. The method is described below.

Figure 9B:
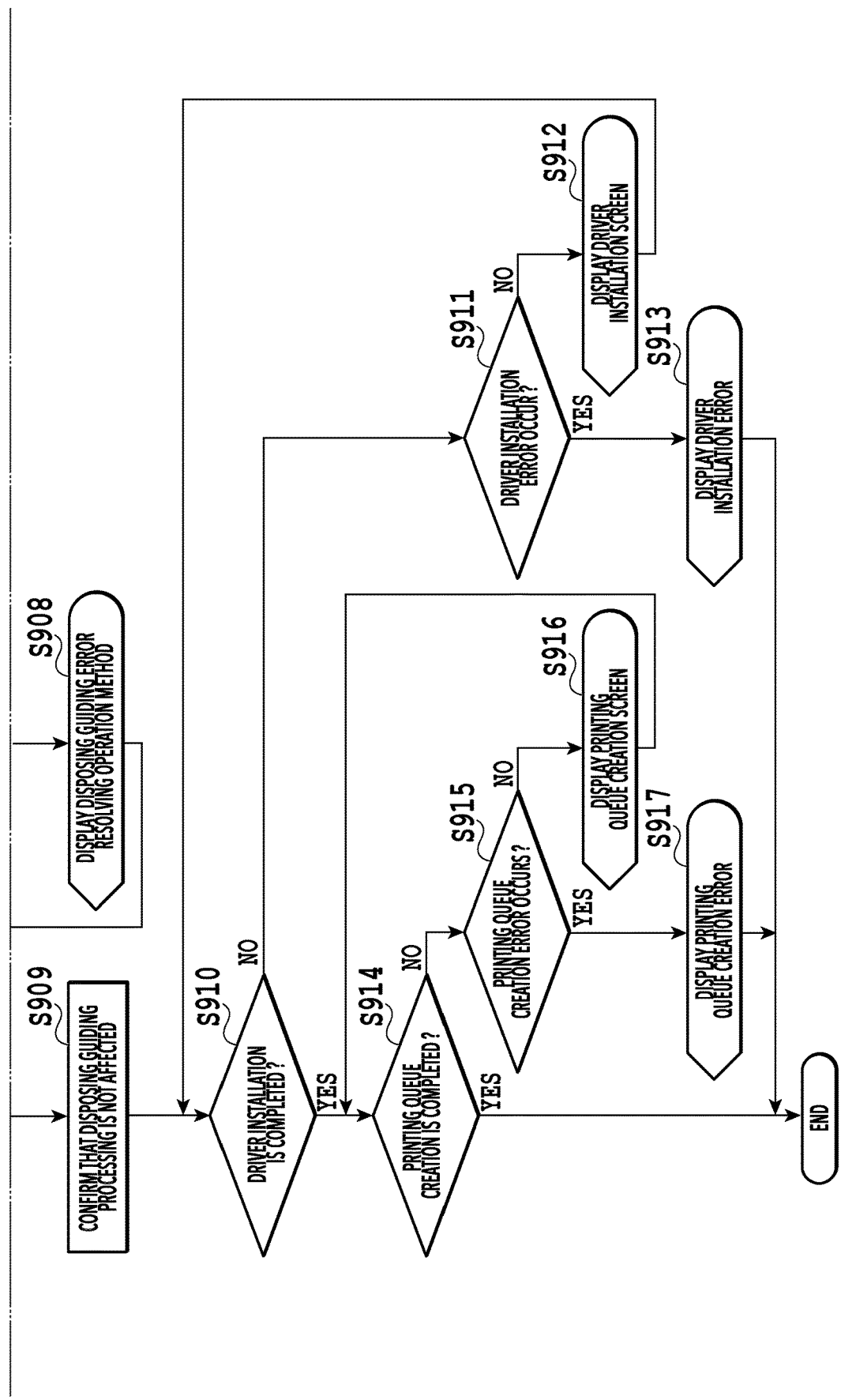
FIG. 9 is a diagram showing the relationship of FIG. 9A and FIG. 9B, and FIG. 9A and FIG. 9B are flowcharts illustrating parallel processing.

FIG. 9A and FIG. 9B are a flowchart illustrating the parallel processing by the computer 101 in the present embodiment. A series of the processing illustrated in FIG. 9A and FIG. 9B are performed with the CPU 102 of the computer 101 deploying the program code stored in the ROM 104 to the RAM 103 to execute. Additionally, a part of or all the functions of the steps in FIG. 9A and FIG. 9B may be implemented by hardware such as an ASIC or an electronic circuit. Note that, the sign "S" in each description of the processing means a step in the flowchart.

Once the parallel processing is started, in S901, the CPU 102 starts the disposing guiding processing. The disposing guiding processing performs the processing described in FIG. 7. Additionally, the driver setting processing executed in the disposing guiding processing performs the processing described in FIG. 5. Thereafter, in S902, in response to the notification from the disposing guiding processing, the CPU 102 displays the disposing guiding screen 1001 illustrated in FIG. 10A on the display device 105 of the computer 101. Thereafter, in S903, the CPU 102 determines whether the disposing guiding processing is completed. The determination in S903 is performed based on whether there is the completion notification from the disposing guiding processing. If it is determined in the determination in S903 that the disposing guiding processing is not completed, the CPU 102 allows the process to proceed to S904 and determines whether an error occurs in the disposing guiding processing.

The determination in S904 is performed based on whether there is the disposing guiding error occurrence notification from the disposing guiding processing. If it is determined in the determination in S904 that an error occurs, the CPU 102 allows the process to proceed to S905 and determines whether the occurring error affects the driver setting processing. The error that affects the driver setting processing includes a paper jam and the like that need the power source operation of the printer to resolve the error. In a case where a paper jam and the like occur, it is determined that there is an error that has an effect. Note that, although the determination on whether the paper jam error occurs is performed in this case, it is also possible to determine whether another error occurs that needs the power source operation to power off to solve or resolve the error. If it is determined in the determination in S905 that the error affects the driver setting processing, the CPU 102 allows the process to proceed to S906 and determines whether the driver setting processing is in the execution. The determination in S906 is performed based on whether there is the printing queue creation completion notification from the driver setting processing.

If it is determined in the determination in S906 that the driver setting processing is in the execution, the CPU 102 allows the process to proceed to S907 and displays the screen 1002 illustrated in FIG. 10B that informs of that an error occurs in the disposing guiding processing on the display device 105 of the computer 101. The screen 1002 displays only that an error occurs and does not inform of an operation to resolve the error. If it is determined in the determination in S905 that the error does not affect the driver setting processing, and if it is determined in the determination in S906 that the driver setting processing is not in the execution, the CPU 102 allows the process to proceed to S908. In S908, the screen 1003 illustrated in FIG. 10C that informs of the operation to resolve the error that occurs in the disposing guiding processing is displayed on the display device 105 of the computer 101.

If it is determined in the determination in S903 that the disposing guiding processing is completed, the CPU 102 allows the process to proceed to S909 and confirms that the subsequent processing does not affect the disposing guiding processing. Since the disposing guiding processing is completed, and there is the completion notification, the subsequent processing does not affect the disposing guiding processing; therefore, the process proceeds to S910, which is the next processing.

In S910, the CPU 102 determines whether the driver installation is completed. The determination in S910 is performed with reference to the database of the driver installation completion state saved by the driver setting processing. If it is determined that the driver installation is not completed, the CPU 102 allows the process to proceed to S911 and determines whether an error occurs in the driver installation. The determination in S911 is performed with reference to the database of the driver installation error occurrence state saved by the driver setting processing.

If it is determined in the determination in S911 that no error occurs, the CPU 102 allows the process to proceed to S912 and displays the driver installation screen 1004 illustrated in FIG. 10D on the display device 105 of the computer 101. The progress bar 1005 on the screen 1004 indicates progress of the driver installation. Then, the CPU 102 allows the process to return to S910 and determines again whether the driver installation is completed. If it is determined in S911 that an error occurs, the CPU 102 allows the process to proceed to S913 and displays the driver installation error screen 1006 illustrated in FIG. 10E on the display device 105 of the computer 101. Once the software end button 1007 on the screen 1006 is pressed, the parallel processing ends.

If it is determined in the determination in S910 that the driver installation is completed, the CPU 102 allows the process to proceed to S914 and determines whether the printing queue creation is completed. The determination in S914 is performed with reference to the database of the printing queue creation completion state saved by the driver setting processing.

If it is determined in the determination in S914 that the printing queue creation is not completed, the CPU 102 allows the process to proceed to S915 and determines whether the printing queue creation error occurs. The determination in S915 is performed with reference to the database of the printing queue creation error occurrence state saved by the driver setting processing. If it is determined in the determination in S915 that no error occurs, the CPU 102 allows the process to proceed to S916 and displays the printing queue creation screen 1008 illustrated in FIG. 10F on the display device 105 of the computer 101. The progress bar 1009 on the screen 1008 indicates the progress of the printing queue creation processing. Thereafter, the CPU 102 allows the process to return to S914 and determines again whether the printing queue creation is completed.

If it is determined in the determination in S915 that an error occurs, the CPU 102 allows the process to proceed to S917 and displays the printing queue creation error screen 1010 illustrated in FIG. 10G on the display device 105 of the computer 101. Once the software end button 1011 on the screen 1010 is pressed, the parallel processing ends.

If it is determined in the determination in S914 that the printing queue creation is completed, the parallel processing ends.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-166698 filed Oct. 18, 2022, which is hereby incorporated by reference wherein in its entirety.

What is claimed is:

1. An information processing apparatus connected to a printer, comprising:
one or more memories that store instructions; and
one or more processors configured to execute the instructions stored in the one or more memories to:
execute first processing to display a disposing guide screen of the printer including ink mounting and execute second processing including installation processing of a driver, wherein the first processing and the second processing are executed in parallel in setup processing to make the printer available; and
control a notification of an error to a user based on whether the first processing is in execution or not in a case where an error occurs in the second processing;
wherein in a case where an error occurs in the second processing during the execution of the first processing, information indicating the error is saved, and control is performed in order not to notify the user of the error during the execution of the first processing by displaying the error based on the information indicating the saved error after the first processing is completed; and
wherein in a case where an error occurs in the second processing after the execution of the first processing is completed, the user is notified of the error at a timing of the occurrence of the error.

2. The information processing apparatus according to claim 1, wherein
in a case where an error occurs in one of the first processing and the second processing, a method of resolving the error is displayed after the other of the first processing and the second processing is completed.

3. The information processing apparatus according to claim 2, wherein the one or more processors further cause the communication apparatus to confirm that the other of the first processing and the second processing is completed.

4. The information processing apparatus according to claim 1, wherein
the one or more processors further cause the communication apparatus to determine whether an error that occurs in one of the first processing and the second processing does not affect the other of the first processing and the second processing.

5. The information processing apparatus according to claim 4, wherein
in a case where the error that occurs in the one of the first processing and the second processing includes a power source operation to power off the apparatus to solve the error, it is determined that the other of the first processing and the second processing is affected.

6. The information processing apparatus according to claim 1, wherein
the second processing includes printing queue creation processing corresponding to the printing apparatus.

7. The information processing apparatus according to claim 6, wherein
the information processing apparatus is connected with a plurality of printing apparatuses.

8. The information processing apparatus according to claim 1, wherein the one or more processors further cause the communication apparatus to:
determine whether the driver has been installed or not after the execution of the first processing is completed;
in a case where it is determined that the driver has not been installed yet, determine whether there is a driver installation error or not; and
in a case where it is determined that the driver installation error exists, notify the user of the driver installation error.

9. The information processing apparatus according to claim 1, wherein the one or more processors further cause the communication apparatus to:
determine whether a printing queue has been created or not after the execution of the first processing is completed;
in a case where it is determined that the printing queue has not been created, determine whether there is a printing queue creation error or not; and
in a case where it is determined that the printing queue creation error exists, notify the user of the printing queue creation error.

10. The information processing apparatus according to claim 1, wherein the one or more processors further cause the communication apparatus to:
switch from display of the disposing guide screen to display of a driver installation screen based on completion of the first processing.

11. The information processing apparatus according to claim 1, wherein the one or more processors further cause the communication apparatus to:
save information indicating an error and perform control in order not to notify the user of the error during the execution of the first processing in a case where the error occurs in printing queue creation during the execution of the first processing.

12. A control method of an information processing apparatus which is connected to a printer, the control method comprising:
executing first processing to display a disposing guide screen of the printer including ink mounting and executing second processing including installation processing of a driver, wherein the first processing and the second processing are executed in parallel in setup processing to make the printer available; and
controlling a notification of an error to a user based on whether the first processing is in execution or not in a case where an error occurs in the second processing;
wherein in a case where an error occurs in the second processing during the execution of the first processing, information indicating the error is saved, and control is performed in order not to notify the user of the error during the execution of the first processing by displaying the error based on the information indicating the saved error after the first processing is completed; and
wherein in a case where an error occurs in the second processing after the execution of the first processing is completed, the user is notified of the error at a timing of the occurrence of the error.

13. A non-transitory computer readable storage medium storing a program for an information processing apparatus which is connected to a printer, wherein the program causes the information processing apparatus to execute a method comprising:
executing first processing to display a disposing guide screen of the printer including ink mounting and executing second processing including installation processing of a driver, wherein the first processing and the second processing are executed in parallel in setup processing to make the printer available; and controlling a notification of an error to a user based on whether the first processing is in execution or not in a case where an error occurs in the second processing;

wherein in a case where an error occurs in the second processing during the execution of the first processing, information indicating the error is saved, and control is performed in order not to notify the user of the error during the execution of the first processing by displaying the error based on the information indicating the saved error after the first processing is completed; and wherein in a case where an error occurs in the second processing after the execution of the first processing is completed, the user is notified of the error at a timing of the occurrence of the error.

* * * * *